(12) United States Patent
Anderson

(10) Patent No.: US 6,369,998 B1
(45) Date of Patent: Apr. 9, 2002

(54) ELECTROSTATIC DISCHARGE PROTECTION CLAMP FOR NOMINAL-VOLTAGE POWER SUPPLY OR I/O WITH HIGH-VOLTAGE REFERENCE

(75) Inventor: Warren R. Anderson, Westborough, MA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/300,016

(22) Filed: Apr. 27, 1999

(51) Int. Cl.$^7$ ............................................. H02H 9/00
(52) U.S. Cl. ..................... 361/111; 261/56; 261/91.1; 261/118
(58) Field of Search ..................... 361/56, 91.1, 111, 361/115, 118, 127, 18

(56) References Cited

U.S. PATENT DOCUMENTS 3,970,900 A * 7/1976 Hodgins ..................... 361/56
5,400,202 A * 3/1995 Metz et al. .................. 361/56

OTHER PUBLICATIONS

T.J. Maloney, et al., "Protection of High Voltage Power and Programming Pins," EOS/ESD Symposium 97–246, pp. 246–254 (3A.7.1–3A.7.9) (Sep. 1997).
W.R. Anderson, et al., "ESD Protection for Mixed–Voltage I/O Using NMOS Transistors Stacked in a Cascode Configuration," EOS/ESD Symposium 98–54, pp. 54–62 (2A.1.1.–2A.1.9) (Oct. 1998).

* cited by examiner

Primary Examiner—Stephen W. Jackson
(74) Attorney, Agent, or Firm—Hamilton, Brook, Smith & Reynolds, P.C.

(57) ABSTRACT

An electrostatic discharge (ESD) protection technique protects a semiconductor device against electrostatic discharge events. The semiconductor device has a pad for receiving a signal. The technique uses an ESD protection circuit that includes a voltage limiter having an input to receive a control voltage that is independent of a pad voltage on the pad; an output to provide, in response to the control voltage, a limited voltage having a magnitude that is less than a magnitude of the control voltage when the control voltage is non-zero and in a steady state; an arrangement of stacked transistors interconnected between the input and the output of the voltage limiter; and a pull-up transistor that is interconnected between the pad and the output of the voltage limiter. A magnitude of the pad voltage is less than the control voltage when the semiconductor device is in a normal operating mode. Additionally, the pad voltage is greater than the control voltage when (i) the semiconductor device is in an ESD protection mode and (ii) a positive ESD event occurs on the pad. The ESD protection circuit further includes a clamping circuit having a first terminal coupled to the pad, a second terminal coupled to a reference conductor, and a control terminal coupled to the output of the voltage limiter. The clamping circuit switchably provides a conducting path between the pad and the reference conductor based on the limited voltage.

19 Claims, 3 Drawing Sheets

ELECTROSTATIC DISCHARGE PROTECTION CLAMP FOR NOMINAL-VOLTAGE POWER SUPPLY OR I/O WITH HIGH-VOLTAGE REFERENCE

BACKGROUND OF THE INVENTION

A typical integrated circuit (IC) includes an IC package and a semiconductor device that is physically and electrically connected within the IC package. The semiconductor device typically includes electrostatic discharge (ESD) protection devices that protect the semiconductor device against ESD events that would otherwise cause damage. Generally, the ESD protection devices are located within the semiconductor device in close proximity to semiconductor device pads, which electrically connect to pins of the IC package.

One conventional ESD protection device provides an ESD clamp (or shunt) between the semiconductor pad to be protected and a reference conductor (i.e., a ground conductor). If power is off (e.g., when the semiconductor device is being handled prior to its installation within an IC package, or when an assembled IC is being handled prior to its installation on a circuit board), the ESD protection device shunts or clamps any positive charge on the pad that is above a particular threshold to the reference conductor. If the power is on (e.g., when the assembled IC is installed on a circuit board and is operational), the ESD protection device is deactivated and an incoming signal on the pad is permitted to pass through to other semiconductor device circuitry, i.e., internal circuits of device. An example of such an ESD protection device is described in U.S. application Ser. No. 08/979,376, entitled "Cross-Referenced Electrostatic Discharge Protection Systems and Methods for Power Supplies," filed Nov. 26, 1997, the entire teachings of which are incorporated herein by this reference.

Due to improvements in semiconductor technology, manufacturers can now make transistors smaller thereby reducing semiconductor-device size and power consumption. The decrease in transistor size has been accompanied by a decrease in transistor voltage tolerance, which is the voltage that can be applied safely across any two terminals of each transistor of the semiconductor device without causing damage, such as thin oxide damage in the context of MOS-type devices, for example. This maximum tolerable voltage for the transistors is commonly referred to as the rated or process technology voltage. For example, older semiconductor devices were built using a 5V process technology where each transistor could tolerate an operating voltage of 5 Volts (V) across any two terminals without sustaining thin oxide damage. More recently, semiconductor devices have been built using a 3.3V process technology. In such devices, the voltage across any two terminals of each transistor must be less than 3.3V in order to avoid causing thin oxide damage. Presently, manufacturers are implementing 2.5V and 1.5V process technologies, and such improvements in semiconductor technology are expected to continue.

Occasionally, manufacturers combine IC's having different semiconductor technologies on the same circuit board or in the same system. For example, a manufacturer may mix some IC's having semiconductor devices built using a 5V process technology with other IC's having semiconductor devices built using a 3.3V process technology in order to obtain some of the benefits of using 3.3V process IC's (e.g., smaller packaging, lower power consumption, greater speed, lower cost). For this reason, an IC containing a semiconductor device using a 3.3V process technology must often be designed to interface with IC's containing semiconductor devices built using a 5V process technology. Specifically, the 3.3V IC must drive and receive signals at the logic levels expected by the 5V IC's in the system. To accomplish this, the 3.3V IC often requires a 5V power supply to power the 3.3V IC's I/O stages. Therefore, the 3.3V IC contains a mixture of 3.3V and 5V circuits.

Providing ESD protection in a mixed voltage IC tends to complicate the design of the ESD clamp and its control circuit. For example, one known semiconductor device includes a cantilevered ESD clamp and an RC-timed control circuit, which is interconnected between the power supply pad and the ESD clamp, to control deactivation of the ESD clamp. When power is off, the RC-timed circuit maintains the ESD clamp in a conductive state for a time period related to the circuit's time constant. This allows the shunting of a short ESD event from the pad to a reference conductor. In contrast, when power is on, the RC-timed circuit operates as a voltage divider to divide a 5 V power supply signal down to a 3.6 V signal, which is used to disable the ESD clamp. Without the reduction in voltage from 5 V to 3.6 V, one or more components of the ESD clamp would be very susceptible to thin oxide damage. An example of such a circuit (hereinafter referred to as the "cantilevered circuit") is described in an article entitled "Protection of High Voltage Power and Programming Pins," by Maloney et al., EOS/ESD Symposium 97–246, (1997).

SUMMARY OF THE INVENTION

While having certain advantages relative to its prior art, the cantilevered circuit does suffer from certain performance problems. In particular, the cantilevered circuit is not well-suited for situations where it is desirable to disable ESD protection using a signal that is independent of the signal received on the ESD protected pad. For example, in the above-described cantilevered circuit, the 3.6 V power supply signal that disables the ESD clamp is derived from the 5 V power supply signal received on the ESD protected pad. The 3.6 V power supply signal is not independent of the 5 V power supply signal. Additionally, the RC-timed deactivation feature of the cantilevered circuit may result in inadequate ESD protection against prolonged ESD events, which are on the order of the time constant of the circuit. Furthermore, when the RC-timed circuit operates as a voltage divider during normal operation, the RC-timed circuit generates a leakage current that increases IC power consumption.

The present invention is directed to a technique for protecting a semiconductor device against ESD events that uses a control voltage that is independent of a pad. The technique involves providing the conducting path between the pad and a reference conductor that is activated and deactivated based on the limited voltage. The ESD stage provides a conducting path between the pad and a reference conductor. In particular, the technique involves providing, in response to the control voltage, a limited voltage having a magnitude that is less than a magnitude of the control voltage.

In general, according to one aspect, the invention features an electrostatic discharge protection circuit for a protected pad of a semiconductor device. The circuit is intended to protect internal circuits of the device from electrostatic discharge. The protection circuit comprises a clamping circuit that is activated to couple electrostatic charge from the protected pad and away from the internal circuits, and deactivated when the internal circuits are operational by reference to a control signal, which is derived from a high-voltage pad. A voltage limiter is also provided that reduces a magnitude of the control signal from the high-voltage pad at an active element of the clamping circuit to less than or equal to a rated voltage of the semiconductor device.

In specific embodiments, the magnitude of the control signal is greater than a magnitude of the protected pad voltage when the internal circuits are operational. For example, the high voltage pad provides power to the semiconductors I/O stages whereas the protected pad powers the core logic. Further, the voltage limiter includes at least one transistor that is interconnected between a control signal pad and the clamping circuit, preferably stacked transistors. Also, the limiter preferably includes a pull-up transistor that is interconnected between the protected pad and the clamping circuit.

In further aspects of the embodiment, the clamping circuit includes control function, specifically comprising an inverter that receives the control signal and a clamp transistor that is driven by the inverter.

In general according to another aspect, the invention features an electrostatic discharge protection method which comprises activating a clamp to couple electrostatic charge from the protected pad and away from the internal circuits in response to a control signal derived from a high-voltage pad. The clamp, however, is deactivated when the internal circuits are operational by reference to the control signal. This control signal since it comes from a high-voltage pad is reduced in magnitude at an active element of the clamping circuit to less than or equal to a rated voltage of the semiconductor device.

Finally, the invention also features a system board comprising an integrated circuit, which includes an electrostatic discharge protection circuit as described above.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings.

DETAILED DESCRIPTION OF PREFERRED EMBODIMENTS

Figure 1:
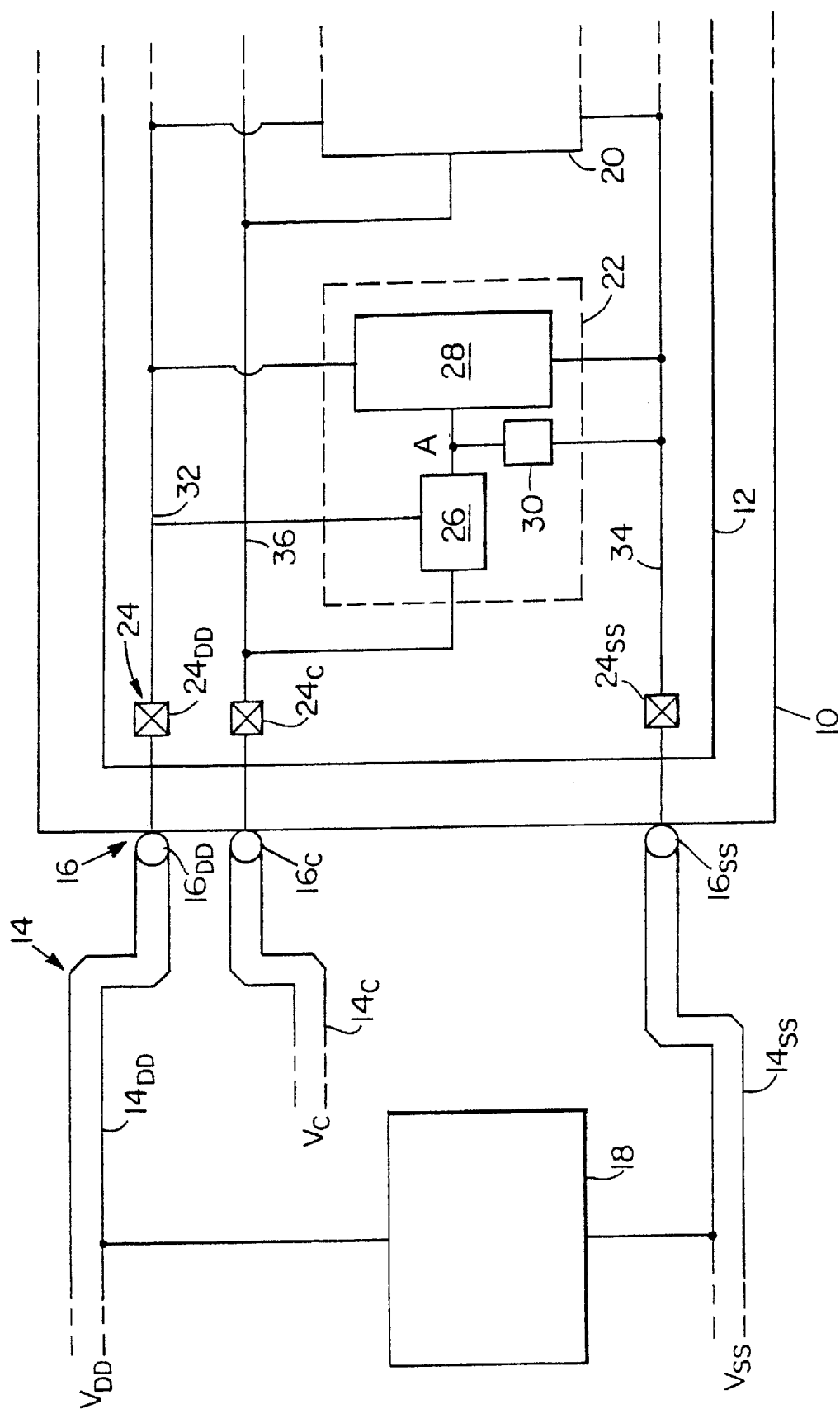
FIG. 1 is a block diagram of an integrated circuit having a semiconductor device that uses an electrostatic discharge (ESD) protection technique according to the present invention.

FIG. 1 shows a portion of a circuit board having an integrated circuit (IC) 10 that includes a semiconductor device 12 that during operation receives voltages on its pad that are greater than the process voltage of its transistors and provides a conducting path that is activated and deactivated based on a control voltage, which is independent of a pad voltage on the pad.

The IC 10 connects with another circuit 18 through circuit board conductors $14_{DD}, 14_C, 14_{SS}$ (collectively conductors 14) and IC pins $16_{DD}, 16_C, 16_{SS}$ (collectively pins 16). By way of example, the circuit 18 is a power supply that provides a power supply signal $V_{DD}$ on conductor $14_{DD}$, and a reference or ground signal $V_{SS}$ on conductor $V_{SS}$. Additionally, the conductor $14_C$ and pin $16_C$ carry a control signal $V_C$. By way of example, the control signal $V_C$ is an I/O power supply signal that drives I/O circuits of the IC 10. In the anticipated implementation, the I/O power supply signal is greater than the process voltage of the semiconductor device 12 to thereby allow the IC 10 to function in a legacy system, in which the voltage transitions on I/O signal lines are also greater than the process voltage.

The circuit board conductors $14_{DD}, 14_C, 14_{SS}$ electrically connect to semiconductor pads $24_{DD}, 24_C, 24_{SS}$ (collectively pads 24) disposed on a surface of the semiconductor device 12. Within the semiconductor device 12, pad $24_{DD}$ connects to a power supply conductor 32, pad $24_{SS}$ connects to a reference conductor 34, and pad $24_C$ connects to a control conductor 36.

The semiconductor device 12 further includes an internal circuit 20 (e.g., an I/O driver or logic gates) and an ESD protection circuit 22. The internal circuit 20 and the ESD protection circuit 22 connect to the power supply conductor 32, the reference conductor 34 and the control conductor 36. In the example, the internal circuit 20 uses the control signal $V_C$ to generate output signals to other devices (i.e., electrical signals that vary between zero and $V_C$).

The ESD protection circuit 22 includes a voltage limiter 26, an ESD clamping and control circuit 28, and a capacitive coupling circuit 30. The voltage limiter 26 connects to the power supply conductor 32, the control conductor 36, and an internal node A. The ESD clamping circuit 28 connects to the power supply conductor 32, the reference conductor 34, and node A. The capacitive coupling circuit 30 is interconnected between node A and the reference conductor 34.

The ESD protection circuit 22 protects the semiconductor device 12 against ESD events that occur on the pad $24_{DD}$. In particular, the voltage limiter 22 provides, in response to the control voltage $V_C$, a limited voltage $V_{LV}$ on node A that does not exceed the control voltage $V_C$ when the control voltage $V_C$ is non-zero and in a steady state such as during normal operation. The limited voltage $V_{LV}$ is equal to the control voltage $V_C$ when the control voltage $V_C$ is zero.

The ESD clamping circuit 28 provides a conducting path between the pad $24_{DD}$ and the reference conductor 34. The conducting path is activated and deactivated based on the limited voltage $V_{LV}$ on node A. When the control voltage $V_C$ is low (e.g., before the IC 10 has been installed on the circuit board), the ESD clamping circuit 28 provides the conducting path for ESD events. Accordingly, the ESD protection circuit 22 protects semiconductor circuitry such as the internal circuit 20 against positive ESD events on the pad $24_{DD}$ by shunting positive ESD charge from the pad $24_{DD}$ to the reference conductor 34. When the control voltage $V_C$ is high (e.g., after the IC 10 has been installed on the circuit board and when the IC 10 is powered up), the ESD clamping circuit 28 is deactivated. Accordingly, the power supply signal $V_{DD}$ is allowed to power the IC 20 (e.g., the internal circuit 20 and/or core circuits of the semiconductor device 12).

Figure 2:
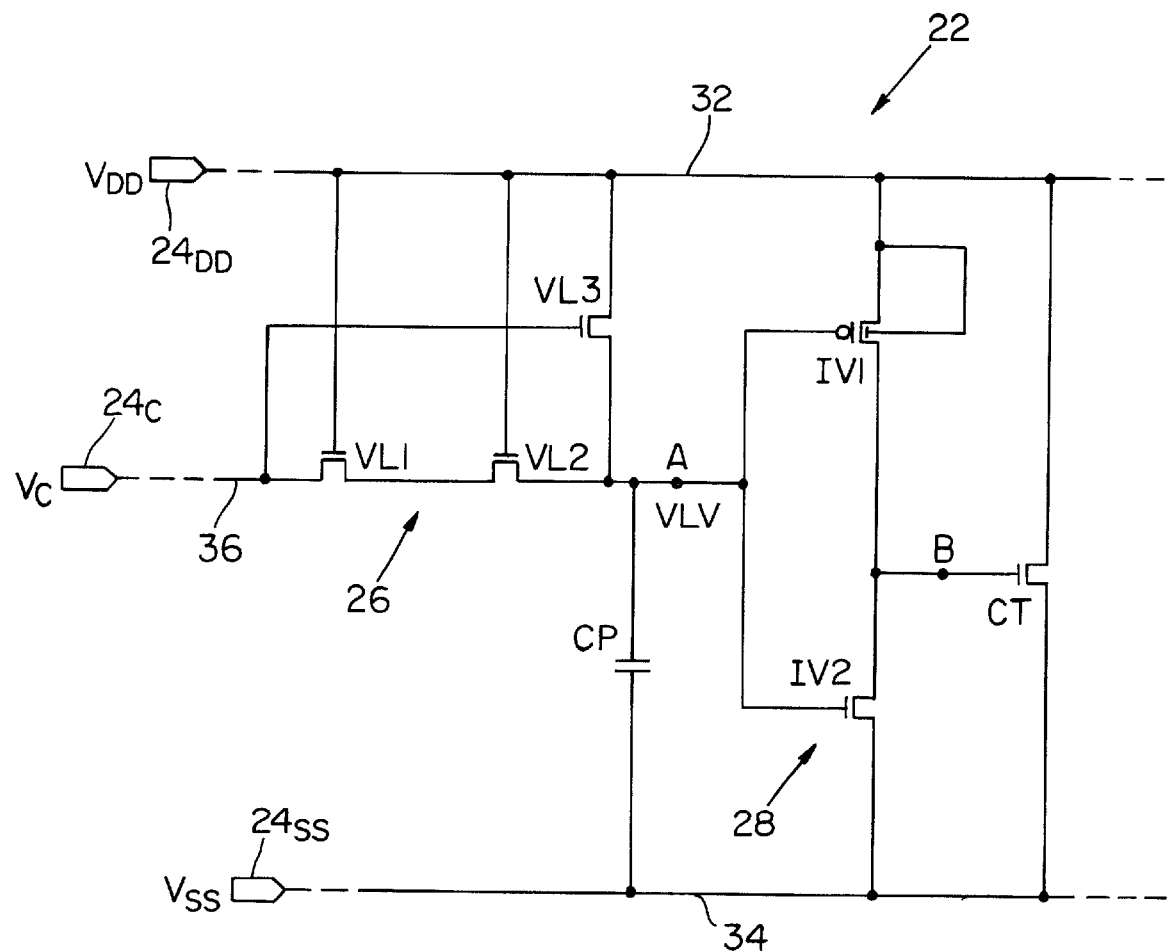
FIG. 2 is a schematic diagram of circuitry within the inventive semiconductor device of FIG. 1.

FIG. 2 shows details of the ESD protection circuit 22 of FIG. 1. The voltage limiter 26 includes a set of transistors VL1, VL2 and VL3. The transistors VL1 and VL2 form a stacked transistor arrangement between the control conductor 36 and node A. The control gates of transistors VL1 and VL2 connect with the power supply conductor 32. The transistor VL3 is interconnected between the power supply conductor 32 and node A. The control gate of transistor VL3 connects with the control conductor 36.

The ESD clamping and control circuit 28 includes transistors IV1, IV2 and CT. The transistors IV1 and IV2 form an inverter having an input at the internal node A and an output at another internal node B. The inverter further connects with the power supply conductor 32 and the reference conductor 34.

The clamp transistor CT forms a switchable ESD clamp (or shunt) between the power supply conductor 32 and the reference conductor 34. The control gate of the transistor CT connects with node B. Preferably, the transistor CT is a relatively large n-MOSFET device. Preferably it is biased to enter low-impedance snap-back or its gate voltage rises high enough to handle ESD charge through normal channel conduction.

The smaller transistor IV1 biases the control gate of the transistor CT above the NMOS threshold during a positive ESD event on the pad $24_{DD}$ when the IC 10 is un-powered, i.e., during an ESD protection mode. The smaller transistor IV2 turns the transistor CT off (deactivates transistor CT) when the IC 10 is powered-up and in normal operation, i.e., during a normal operating mode.

The capacitive coupling circuit 30 includes a capacitor CP interconnected between the internal node A and the reference conductor 34. The capacitive coupling circuit 30 provides additional assurance that node A remains low during a positive ESD event on pad $V_{DD}$ to enable the transistor IV1 to properly bias the control gate of the transistor CT.

When the semiconductor device 12 is un-powered, the semiconductor device 12 is in an ESD protection mode and the transistor CT provides the ESD clamp. In particular, no voltage (zero Volts) on the control conductor 36 results in no voltage at node A. Accordingly, during a positive ESD event on the pad $24_{DD}$, the transistor IV1 turns-on and allows positive charge on the pad $24_{DD}$ to activate the transistor CT shunting the charge to the reference conductor 34. The capacitor CP provides additional assurance that node A remains at a low voltage during the ESD event thus keeping the transistor IV1 turned on even if some coupling exists between conductors 32 and 36.

When the semiconductor device 12 is powered-up, the semiconductor device 12 is in a normal operating mode, and the transistor CT is turned off. In particular, the control conductor 36 carries a control voltage $V_C$ (e.g., 3.3 V) resulting in the limited voltage $V_{LV}$ at node A (e.g., $V_{LV}$=2.5 V). Accordingly, the transistor IV2 turns on and deactivates the transistor CT.

It should be understood that the control voltage $V_C$ is independent of the pad voltage $V_{DD}$, and that the ESD protection circuit 22 is suitable for environments where (i) the pad voltage $V_{DD}$ does not exceed the rated or process voltage of the semiconductor device 12 but (ii) the control voltage $V_C$ exceeds this rated voltage.

By way of example, suppose that the semiconductor device is formed of transistors having a rated voltage 2.5 V and the pad voltage $V_{DD}$ is 2.5 V and the control voltage $V_C$ is 3.3 V during operation. The voltage limiter 26 (i.e., the arrangement of stacked transistors VL1 and VL2 and the transistor VL3) provides a limited voltage $V_{LV}$ at node A that is approximately 2.5 V. In particular, the transistor VL3 operates as a pull-up transistor to set the limited voltage $V_{LV}$ to approximately 2.5 V guaranteeing that the ESD clamping circuit 28 is turned off. The stacked transistors VL1 and VL2 provide voltage drops between the control conductor 36 and node A such that the voltage across any two transistor terminals of the voltage limiter 26 does not exceed 2.5 V. Since both the pad $24_{DD}$ and node A are at 2.5 V, the voltage across any two transistor terminals of the ESD clamping circuit 28 does not exceed 2.5 V.

Due to the arrangement of transistors within the voltage limiter 26, it should be understood that the limited voltage $V_{LV}$ does not exceed the pad voltage $V_{DD}$. For example, when the pad voltage is at 2.5 V and the control voltage $V_C$ is 3.3 V, the limited voltage $V_{LV}$ is slightly less than 2.5 V. If the control voltage $V_C$ were varied to be higher than 3.3 V, such as 3.5 V, the limited voltage $V_{LV}$ would still not exceed the pad voltage $V_{DD}$ of 2.5 V. Accordingly, the voltage applied to the transistors of the ESD clamping circuit 28 does not exceed their rated tolerance, thereby avoiding thin-oxide damage.

In one embodiment, the capacitor CP is implemented as a transistor with a control gate as one end of the capacitor, and source and drain as another end of the capacitor. Since the voltage at node A does not exceed 2.5 V, the transistor functioning as capacitor CP is not exposed to a voltage that is higher than 2.5 V.

Since the voltage tolerances are not exceeded, thin oxide damage is avoided. As such, the ESD protection circuit 22 is well suited for environments having an independent control voltage, which turns off ESD protection, that is higher than the semiconductor device tolerance.

Figure 3:
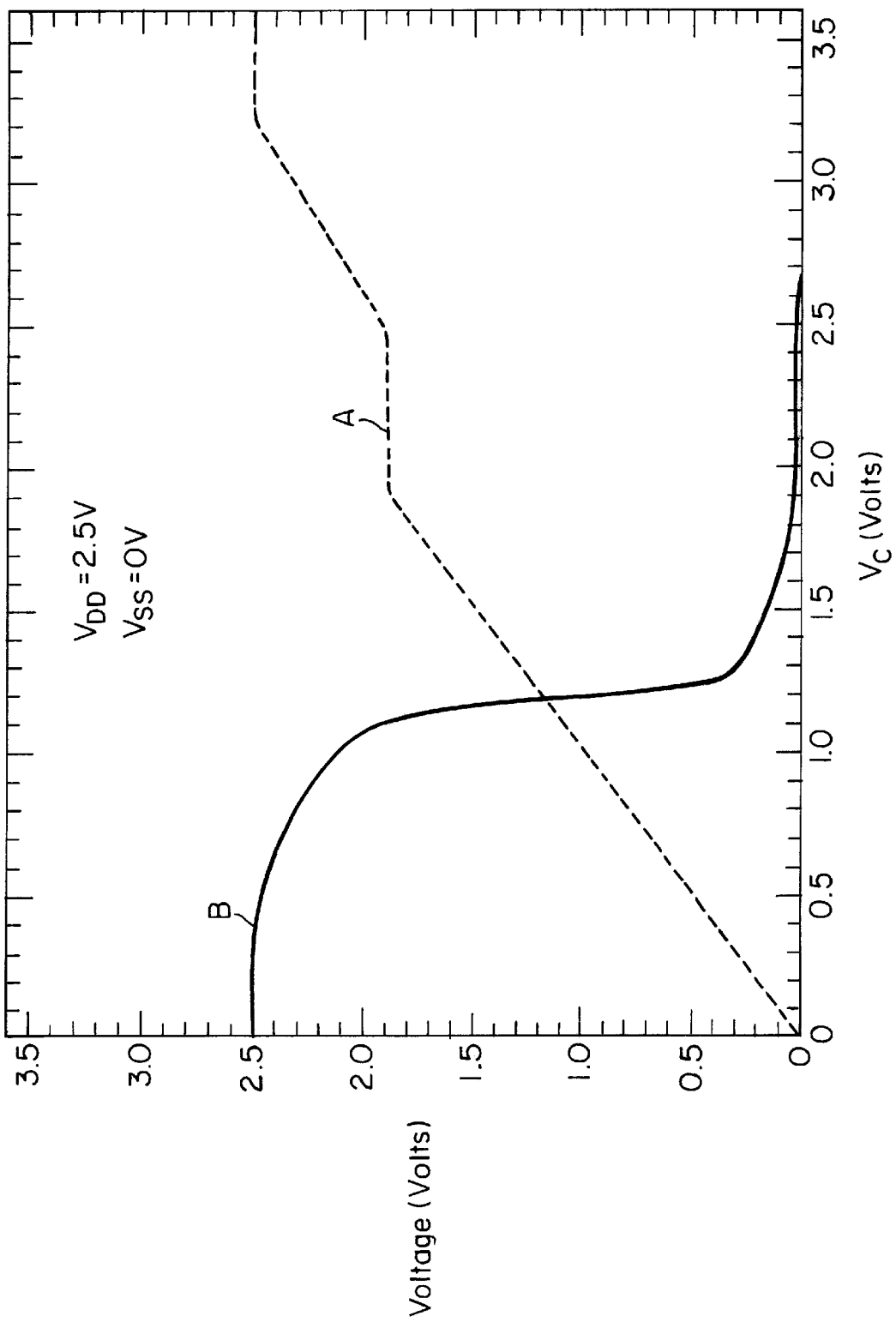
FIG. 3 is a chart of voltages within the circuitry of FIG. 2.

FIG. 3 shows a chart of the behavior of voltage values at nodes A and B of FIG. 2 when the semiconductor device 12 is built using a 2.5V process, $V_{DD}$ is at 2.5 V and $V_{SS}$ is at zero V. The semiconductor device 12 operates in ESD protection mode in the area of the chart where $V_C$ is low (e.g., less than 0.5 V). The semiconductor device 12 operates in normal operating mode in the area of the chart where $V_C$ is high (e.g., greater than or equal to 2.5 V).

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the term "pad" refers to any semiconductor device mechanism that facilitates electrically connecting the semiconductor device to the external environment. By way of example, the pads 24 of FIG. 1 have been described as wire bonding pads. Alternatively, the pads may be other types of connecting mechanisms such as surfaces for flip-chip/solder-bumping processes.

Furthermore, it should be understood that the capacitive coupling circuit 30 is optional. The coupling existing at the internal node A is sufficient in certain implementations such that the capacitive coupling circuit 30 is unnecessary to provide a guarantee that the ESD clamping circuit remains on during an ESD event on the pad. Nevertheless, if a capacitive coupling circuit is used, it may be alternatively interconnected between the power supply conductor 32 and the internal node B.

Additionally, it should be understood that the particular voltages used in the description were provided by way of example only. Other voltages would suitable as well.

Furthermore, it should be understood that the pad $24_{DD}$ was described as being a pad that receives a power supply signal $V_{DD}$ by way of example only. The invention also applies to protecting other power supply pads and I/O signal pads as well. In some situations, minor modifications may be needed such as selecting proper transistor characteristics to utilize snapback.

Additionally, it should be understood that the control signal $V_C$ was described as an I/O power supply signal by way of example only. Alternatively, the control signal $V_C$ is simply a dedicated control signal used to disable ESD protection circuits, or another signal having an additional function on the circuit board of FIG. 1.

Furthermore, it should be understood that the invention was described using positive voltages. One skilled in the art would understand that the invention can be implemented using negative voltages with minimal modifications, and that such modifications are intended to be within the scope of the invention.

What is claimed is:

1. An electrostatic discharge protection circuit for a protected pad of a semiconductor device to protect its internal circuits from electrostatic discharge, the protection circuit comprising:
    a clamping circuit that is activated to couple electrostatic charge from the protected pad and away from the internal circuits, and deactivated when the internal circuits are operational by reference to a control signal, which is derived from a high-voltage pad, which is designed to receive a voltage greater than a rated voltage of the semiconductor device; and
    a voltage limiter that limits a magnitude of the control signal at an active element of the clamping circuit to less than the rated voltage, the voltage limiter preventing the magnitude of the control signal from floating during electrostatic discharge events to ensure that the clamping circuit is activated.

2. The electrostatic discharge protection circuit of claim 1, wherein the magnitude of the control signal is greater than a magnitude of the protected pad voltage when the internal circuits are operational.

3. The electrostatic discharge protection circuit of claim 1, wherein the voltage limiter includes at least one transistor that is interconnected between a control signal pad and the clamping circuit.

4. The electrostatic discharge protection circuit of claim 1, wherein the voltage limiter includes stacked transistors that are interconnected between a control signal pad and the clamping circuit.

5. The electrostatic discharge protection circuit of claim 4, wherein the voltage limiter includes a pull-up transistor that is interconnected between the protected pad and the clamping circuit.

6. The electrostatic discharge protection circuit of claim 5, wherein the clamping circuit comprises:
    an inverter forming a control circuit that receives the control signal; and
    a clamp transistor that is driven by the inverter.

7. The electrostatic discharge protection circuit of claim 1, wherein the voltage limiter includes a pull-up transistor that is interconnected between the protected pad and the clamping circuit.

8. The electrostatic discharge protection circuit of claim 1, wherein the clamping circuit comprises:
    an inverter that receives the control signal; and
    a clamp transistor that is driven by the inverter.

9. The electrostatic discharge protection circuit of claim 1, further comprising a capacitor between an input to the inverter and a reference conductor.

10. An electrostatic discharge protection circuit for a rated voltage pad of a semiconductor device that receives a rated voltage power signal during operation that is less than a rated voltage of the semiconductor device, the protection circuit comprising:
    a clamping and control circuit that is activated to couple electrostatic charge from the power pad and away from internal circuits, and deactivated when the internal circuits are operational by reference to a control signal, which is derived from a high-voltage pad, the clamping and control circuit comprising:
    an inverter that receives the control signal, and
    a clamp transistor that is driven by the inverter, and
    a voltage limiter that reduces a magnitude of the control signal at the inverter of the clamping and control circuit to less than the rated voltage, the voltage limiter preventing the magnitude of the control signal from floating at the inverter of the clamping and control circuit during electrostatic discharge events to ensure that the clamping and control circuit is activated, the voltage limiter comprising:
        stacked transistors interconnected between the high-voltage pad and the clamping circuit, and
        a pull-up transistor that is interconnected between the protected nominal voltage pad and the stacked transistors.

11. An electrostatic discharge protection method for a protected pad of a semiconductor device to protect its internal circuits from electrostatic discharge, the protection method comprising:
    activating a clamp to couple electrostatic charge from the protected pad and away from the internal circuits in response to a control signal derived from a high-voltage pad, which is designed to receive a voltage greater than a rated voltage of the semiconductor device;
    deactivating the clamp when the internal circuits are operational by reference to the control signal;
    reducing a magnitude of the control signal at an active element of the clamping circuit to less than the rated voltage, when the internal circuits are operational; and
    preventing the magnitude of the control signal from floating during electrostatic discharge events to ensure that the clamp is activated.

12. The electrostatic discharge protection method of claim 11, wherein the magnitude of the control signal is greater than a magnitude of the protected pad voltage when the internal circuits are operational.

13. The electrostatic discharge protection method of claim 11, wherein the step of reducing the magnitude of the control signal comprises transmitting the control signal through at least one transistor that is connected to a control signal pad.

14. The electrostatic discharge protection method of claim 11, wherein the step of reducing the magnitude of the control signal comprises transmitting the control signal through stacked transistors that are interconnected between a control signal pad and the clamping circuit.

15. The electrostatic discharge protection method of claim 14, wherein the step of reducing the magnitude of the control signal further comprises controlling the magnitude with a pull-up transistor that is interconnected between the protected pad and the clamping circuit.

16. The electrostatic discharge protection method of claim 11, wherein the step of reducing the magnitude of the control signal further comprises controlling the magnitude with a pull-up transistor that is interconnected between the protected pad and the clamping circuit.

17. The electrostatic discharge protection method of claim 11, further comprising providing capacitive coupling between a control terminal of the clamp and a reference conductor.

18. An electrostatic discharge protection circuit for a protected pad of a semiconductor device to protect its internal circuits from electrostatic discharge, the protection circuit comprising:

clamping means for coupling electrostatic charge from the protected pad and away from the internal circuits, and for deactivating when the internal circuits are operational by reference to a control signal, which is derived from a high-voltage pad; and voltage limiting means for reducing a magnitude of the control signal at an active element of the clamping means to less than a rated voltage of the semiconductor device, the voltage limiting means for preventing the magnitude of the control signal from floating during electrostatic discharge events to ensure that the clamping means is activated.

19. A system board comprising an integrated circuit, which includes an electrostatic discharge protection circuit for a protected pad of a semiconductor device packaged in the integrated circuit to protect its internal circuits from electrostatic discharge, the protection circuit comprising:

a clamping and control circuit that is activated to couple electrostatic charge from the protected pad and away from the internal circuits, and deactivated when the internal circuits are operational by reference to a control signal, which is derived from a high-voltage pad which is designed to receive a voltage greater than a rated voltage of the semiconductor device; and a voltage limiter that reduces a magnitude of the control signal at an active element of the clamping circuit to less than a rated voltage of the semiconductor device, the voltage limiter that prevents the magnitude of the control signal from floating during electrostatic discharge events to ensure that the clamping and control circuit is activated.

* * * * *